US008866028B2

(12) United States Patent
Zheng (10) Patent No.: US 8,866,028 B2
(45) Date of Patent: Oct. 21, 2014

(54) COMBINATION WEIGHING DEVICE THAT DIVIDES MATERIAL TREATING UNITS INTO TWO SECTIONS WITH SEPARATE DATA RECEIVING AND DELIVERING COMMUNICATION CONVERTERS FOR EACH SECTION

(75) Inventor: Jinkang Zheng, Foshan (CN)

(73) Assignee: Guangdong Highdream Intellectualized Machinery Co., Ltd., Foshan, Guangdong (CN)

( * ) Notice: Subject to any disclaimer, the term of this patent is extended or adjusted under 35 U.S.C. 154(b) by 277 days.

(21) Appl. No.: 13/381,637

(22) PCT Filed: Oct. 23, 2009

(86) PCT No.: PCT/CN2009/074586
§ 371 (c)(1),
(2), (4) Date: Dec. 29, 2011

(87) PCT Pub. No.: WO2011/000185
PCT Pub. Date: Jan. 6, 2011

(65) Prior Publication Data
US 2012/0103703 A1    May 3, 2012

(30) Foreign Application Priority Data
Jun. 29, 2009    (CN) .......................... 2009 1 0040633

(51) Int. Cl.
G01G 19/393 (2006.01)
B65B 37/18 (2006.01)
B65B 1/32 (2006.01)

(52) U.S. Cl.
CPC . *B65B 37/18* (2013.01); *B65B 1/32* (2013.01); *G01G 19/393* (2013.01)
USPC .................................................... 177/25.18

(58) Field of Classification Search
USPC ...................................................... 177/25.18
See application file for complete search history.

(56) References Cited

U.S. PATENT DOCUMENTS 4,399,880 A  *  8/1983  Konishi ............................ 177/1
4,676,326 A  *  6/1987  Konishi ............................ 177/1
(Continued)

FOREIGN PATENT DOCUMENTS

CN    101061376 A    10/2007
CN    101310167 A    11/2008
(Continued)

OTHER PUBLICATIONS

International Search Report and Written Opinion in International Application No. PCT/CN2009/074586, mailed Apr. 1, 2010.

*Primary Examiner* — Randy W Gibson
(74) *Attorney, Agent, or Firm* — Nixon Peabody LLP (57) ABSTRACT le;.5qA combination weighing device and an operating method thereof are disclosed. The device comprises N material treating units, a mainboard, chutes (10, 11, 16, 17) and discharging hoppers (12, 13, 14), wherein the material treating units are used for receiving materials, outputting the weight value of materials and discharging materials according to the discharging control signal from the mainboard; the mainboard is used for selecting materials by combinatorial calculation based on the present-period weight value during every period and outputting the discharging control signal to weighing hoppers (7); the chutes (10, 11, 16, 17) are used for collecting the materials through a discharging route, discharging the materials to the discharging hoppers (12, 13, 14), after a discharging route is determined; the discharging hoppers (12, 13, 14) are used to separately collect materials discharged from the chutes (10, 11, 16, 17) during the same weighing period and send the materials to a packing machine; each material treating unit comprises a linear vibrator (5), a feed hopper (6), a weighing hopper (7), a weighing sensor used to weigh the materials in the weighing hopper (7), a processor and a A/D converter which is connected with the weighing sensor and the processor, N material treating units are connected with the mainboard signal together by two data receiving and delivering communication converters of the mainboard.

9 Claims, 4 Drawing Sheets

(56) References Cited

U.S. PATENT DOCUMENTS

| | | | |
|---|---|---|---|
| 4,967,856 A * | 11/1990 | Kawanishi et al. | 177/1 |
| 6,046,411 A * | 4/2000 | Kawanishi et al. | 177/25.13 |
| 6,493,605 B1 | 12/2002 | Prideaux et al. | |
| 6,833,514 B2 * | 12/2004 | Gesuita et al. | 177/25.18 |
| 8,115,118 B2 * | 2/2012 | Kawanishi | 177/25.18 |
| 8,119,935 B2 * | 2/2012 | Kawanishi | 177/25.18 |

FOREIGN PATENT DOCUMENTS

| | | |
|---|---|---|
| CN | 101421595 A | 4/2009 |
| EP | 0 072 707 A2 | 2/1983 |
| EP | 0 219 347 A2 | 4/1987 |
| JP | 8-152353 A | 6/1996 |

* cited by examiner

COMBINATION WEIGHING DEVICE THAT DIVIDES MATERIAL TREATING UNITS INTO TWO SECTIONS WITH SEPARATE DATA RECEIVING AND DELIVERING COMMUNICATION CONVERTERS FOR EACH SECTION

CROSS-REFERENCE TO RELATED PATENT APPLICATIONS

The present application is a National Stage Application of International Application No. PCT/CN2009/074586 entitled "Combination Weighing Device And Operating Method Thereof" filed Oct. 23, 2009, which claims priority of Chinese Patent Application No. 200910040633.4, filed on Jun. 29, 2009, the contents of which are incorporated herein by reference in their entirety.

FIELD OF THE INVENTION

The present invention relates to a weighing device and an operating method thereof, and in particular to a combination weighing device and an operating method which can be used in combination with a high-speed packaging machine or a plurality of packaging machines.

BACKGROUND OF THE INVENTION

European Patent Publication No. EP 0219347B1 filed by ISHIDA SCALES MFG CO., LTD. with the filing date of 14 Oct. 1986 and the publication date of 14 Mar. 1990 discloses a weighing method and system, wherein a plurality of article batch handling units is controlled so that a high-speed dual or multiple packaging unit can be coupled and its capability can be utilized advantageously. For each cycle of the system operation, three or more combinations are selected by combinatorial computations on the weight values of article batches and they are discharged to the packaging unit through two discharge routes or more but fewer than the number of the selected combinations. This has the effect of discharging through each discharging route more than one per cycle.

Japanese Patent Publication No. JP8152353B2 filed by ISHIDA SEISAKUSHO with the filing date of 10 Apr. 1995 and the publication date of 11 Jun. 1996 discloses a method and apparatus for collecting material to be measured in combined measuring apparatus, wherein the collecting device is connected to a plurality of packaging machines, and at least three combinations are selected in each weighing cycle and the material is discharged through two or more discharging routes such that interactive packaging is realized. In this patent, the number of the discharging routes is also less than the number of combinations.

In the prior art as described in the above patents, each material treating unit includes a linear vibrator, a feed hopper and a weighing hopper. The weighing device uses the following connections: a weighing sensor is connected to an A/D converter which is connected to a processor, and the output result of the processor is sent to the mainboard to be computed. The weighing process of the weighing hopper in each weighing cycle is as follows: the weighing sensor is connected with weighing hoppers in the material treating unit one by one, that is, the weighing hoppers are weighed one by one until all the weighing hoppers are weighed, the weight of the materials in each weighing hopper is converted by the A/D converter and then sent to the mainboard to be computed. Furthermore, all the weighing hoppers are connected to one A/D converter, and thus the interchange is poor, and the weighing speed is not fast enough. Moreover, the number of the material discharging routes is less than the number of combinations, and the weighing hopper discharges the materials in three combinations through two discharging routes in turn. Compared with the traditional combination weighing device, the speed of material discharging is only increased by 1.5 times.

SUMMARY OF THE INVENTION

It is an object of the present invention to overcome the shortcomings of the prior art to provide a combination weighing device and an operating method thereof, wherein each material treating unit is provided with a weighing sensor, an A/D converter and a processor, the weighing process is finished on its own, and the number of the material discharging routes is equal to the number of combinations selected in each weighing cycle. The efficiency of the combination weighing device and the packaging speed are thus greatly improved.

The above object of the present invention is achieved by the following technical solution: a combination weighing device comprises: N material treating units for receiving materials, outputting the weight value of materials and discharging materials according to the discharging control signal from the mainboard; a mainboard for performing combinatorial calculation periodically according to the weight value inputted from the material treating units, selecting material combinations based on the preset weight value during every period and outputting the discharging control signal to weighing hoppers participating in the material combinations to allow the weighing hoppers to discharge materials through corresponding discharging routes; chutes for defining the discharging routes, collecting the materials from the material treating units through the discharging routes, and discharging the materials to discharging hoppers; discharging hoppers for separately collecting materials discharged from the chutes during the same weighing period and send the materials to a packing machine; each of the material treating units comprising a linear vibrator, a feed hopper, and a weighing hopper, wherein each of the material treating units further comprises a weighing sensor used to weigh the materials in the weighing hopper, a processor and a A/D converter which is connected with the weighing sensor and the processor, N material treating units are connected with the mainboard through two data receiving and delivering communication converters of the mainboard in total.

Preferably, the number of the discharging routes is equal to the number of the material combinations selected by the mainboard in each weighing period.

Preferably, the number N is equal to 18.

Preferably, the number of the material combinations selected by the mainboard in each weighing period is 3; the number of the discharging routes is 3, i.e. the first discharging route, the second discharging route and the third discharging route.

Preferably, the chutes comprise a first outer chute, a second outer chute, a first inner chute, and a second inner chute; the first outer chute and the second outer chute are symmetrically arranged on both sides of central axis of the combination weighing device, the first inner chute and the second inner chute are symmetrically arranged on both sides of central axis of the combination weighing device; the first outer chute and the first inner chute are located at the same side of the combination weighing device, and the first outer chute is located outside the first inner chute; the second outer chute and the second outer inner chute are located at the same side of the combination weighing device, and the second outer chute is located outside the second inner chute; the discharging hoppers comprise a first discharging hopper, a second discharging hopper, and a third discharging hopper, the first outer chute defines a first discharging route with a lower end thereof facing the first discharging hopper, the second outer chute defines a second discharging route with a lower end thereof facing the second discharging hopper, the first inner chute and the second inner chute define a third discharging route with a lower end thereof facing the third discharging hopper.

Preferably, the weighing hopper in each material treating unit has two doors, each door has an opening facing one discharging route; the mainboard controls the weighing hopper to open the door desired to be opened when discharging; materials in each material treating unit are discharged through one of the third discharging route and the first discharging route or one of the third discharging route and the second discharging route.

The operating method of the above combination weighing device comprises three steps: materials in the weighing hoppers are weighed in each weighing period, and the weighing hoppers to be combined are determined, the material combinations according to selecting sequence comprises a first combination, a second combination and a third combination; the weighing hoppers to be combined discharge materials to the discharging hoppers through corresponding discharging routes; materials in the discharging hoppers are discharged and then packaged; wherein the step of the materials in the weighing hopper being weighted in each weighing period refers to that the weighing sensor in each material treating unit weighs the materials in the weighing hoppers simultaneously, and the weighing results are sent to the mainboard via the A/D converter, the processor and the data receiving and delivering communication converter on the mainboard.

Preferably, the materials being discharged through the corresponding discharging routes refers to the materials being simultaneously discharged from the selected first combination, the selected second combination and the selected third combination to the discharging hopper, wherein the selected first combination discharges materials through the first discharging route, the selected second combination discharges materials through the second discharging route, and the selected third combination discharges materials through the third discharging route.

The materials discharged from the discharging hoppers are packaged, and the packaging arrangement includes the following ways: 1. three discharging hoppers are connected to three packaging machines respectively; 2. three discharging hoppers are connected to a packaging machine in which three times of the weight can be packaged, or connected to a packaging machine with three-member synchronous packaging machine; 3. three discharging hoppers are connected to a high-speed packaging machine and discharge the materials to the high-speed packaging machine by turns.

Figure 2:
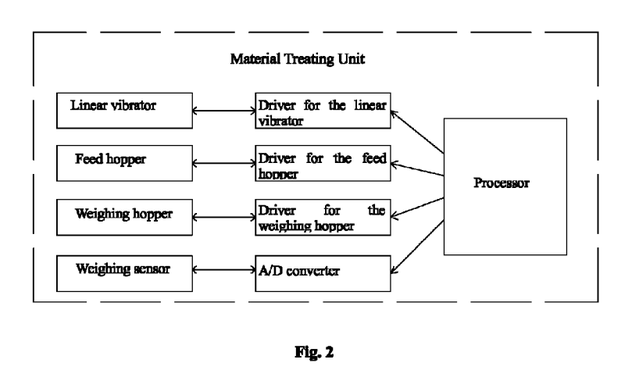
FIG. 2 is a block diagram of the circuit of the material treating unit.
Figure 3:
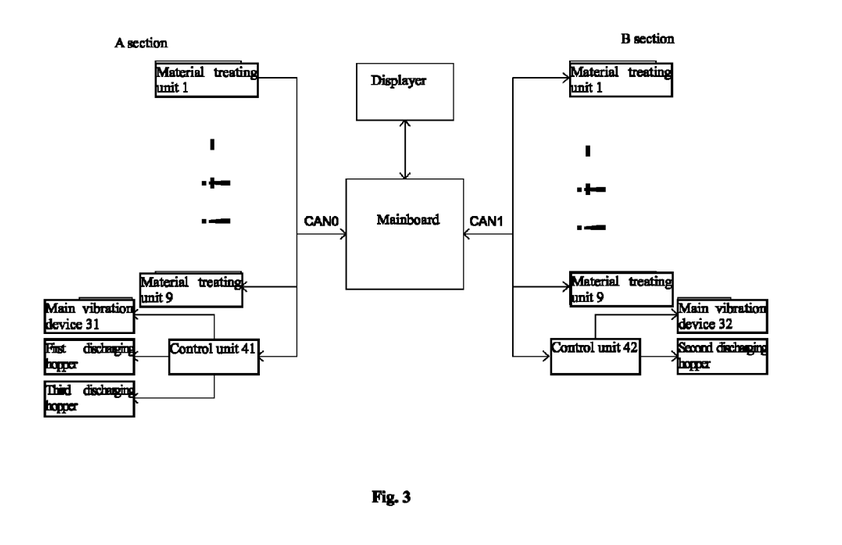
FIG. 3 is a block diagram of the electric control of the device according to the present invention.

The weighing principle and steps of the device according to the present invention are as follows:

1. The linear vibrator, the feed hopper, the weighing hopper, the weighing sensor and the A/D converter are used as a material treating unit, as shown in FIG. 2; then, 18 material treating units are divided into two groups, i.e. the left group and the right group, as shown in FIG. 3, and each group contains 9 material treating units with serial number 1 to 9, and the left section and the right section (i.e. A section and B section) are distinguished through the ports of two data receiving and delivering communication converters of the mainboard, the hoppers without materials are simultaneously added with materials, and after being weighed, it is transmitted to the mainboard to calculate and combine, and then three combinations that meet the preset target weight are selected. The first combination is formed by selecting the qualified target weight in the nine weighing hoppers on the left (units with 1 to 9 serial number in the A section), and preferably four weighing hoppers participate in the combination. The second combination is formed by selecting the qualified target weight in the nine weighing hoppers on the right (units with 1 to 9 serial number in the B section), and preferably four weighing hoppers participate in the combination. The third combination is formed by selecting the qualified target weight in the remaining ten weighing hoppers (18-4-4) in the left and right sections (unites with serial number 1 to 9 in the A and B sections), and preferably four weighing hoppers participate in the combination.

2. Each weighing hopper has two doors that are controlled by the positive and negative rotation of a step motor (the control signal is sent by the mainboard to control the step motor), to realize the selected three combinations to discharge materials towards the corresponding discharging routes simultaneously (each door leaf faces one discharging route).

It can be seen from the above described technical solution, weighing principle and steps that the present invention has the following advantages in comparison with the prior art:

1. in the present invention, 18 material treating units are divided into two sections, i.e. the A section and the B section, and two separate data receiving and delivering communication converters, and data transmitting speed is notably improved; 18 weighing hoppers are controlled by 18 processors respectively, such that the weighing process is finished separately, which improves the efficiency of the combination weighing device.

2. the present invention uses double inner and outer chutes to discharge the materials and realizes three discharging routes: each weighing hopper has two doors that are controlled by the positive and negative rotation of a step motor, and materials are discharged into the outer chute or the inner chute, the first combination materials are discharged into the first outer chute, the second combination materials are discharged into the second outer chute, and the third combination materials are discharged into the first inner chute or the second inner chute; the material discharging speed is further improved in comparison with the prior art.

3. the discharging hopper in the present invention has three discharging ways: 1. three discharging hoppers are connected to three packaging machines respectively; 2. three discharging hoppers are connected to a packaging machine in which three times of the weight can be packaged, or connected to a packaging machine with three-member synchronous packaging machine; 3. three discharging hoppers are connected to a high-speed packaging machine and discharge the materials to the high-speed packaging machine by turns. The packaging speed is thus improved by setting different way of discharging.

DETAILED DESCRIPTION OF THE PREFERRED EMBODIMENT

The invention will be further described in details in the following embodiments accompanying the drawings. It will nevertheless be understood that no limitation of the scope of the invention is thereby intended.

Figure 1:
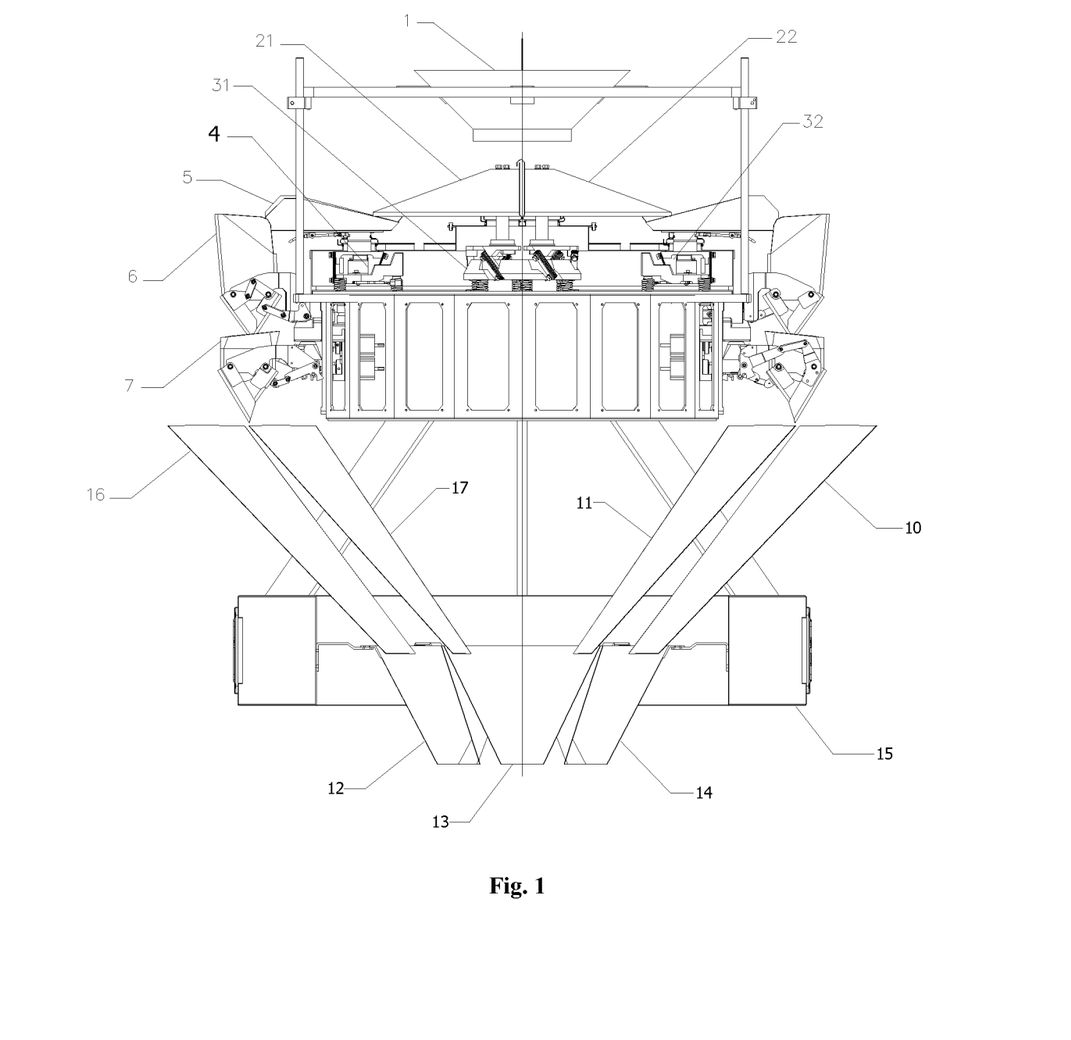
FIG. 1 is a structural view of the device according to the present invention.

Referring to FIGS. 1 and 3, the combination weighing device includes: a storage hopper 1; a main vibration disk 21 and a main vibration disk 22 which are located below the storage hopper 1; a main vibration device 31 and a main vibration device 32 for driving the vibration of the main vibration disk 21 and the main vibration disk 22; eighteen material treating units for receiving materials and outputting the weight value of materials and discharging materials according to the discharging signal from the mainboard; one mainboard for performing combinatorial calculation periodically according to the weight value inputted from the material treating units, selecting material combinations based on the preset weight value during every period and outputting the discharging control signal to weighing hoppers participating in the material combinations to allow the weighing hoppers to discharge materials through corresponding discharging routes; chutes for defining the discharging routes, collecting the materials from the material treating units through the discharging routes, and discharging the materials to discharging hoppers; discharging hoppers which are used to separately collect materials discharged from the chutes during the same weighing period and send the materials to a packing machine; each material treating unit comprises a linear vibration disk 4 for receiving materials outputted from the main vibration disk, a linear vibrator 5 for driving the vibration of the jarring disk 4, a feed hopper 6, and a weighing hopper 7, wherein the materials are sieved by the linear vibration disk 4 and then enters into the feed hopper 6 and then enters into the weighing hopper 7.

The chutes include a first outer chute 16 defining a first discharging route, a second outer chute 10 defining a second discharging route, a first inner chute 11, and a second inner chute 17. The first inner chute and the second inner chute define a third discharging route. The materials in each material treating unit can be discharged through one of the third discharging route and the first discharging route, or one of the third discharging route and the second discharging route. The number of the discharging routes is equal to the number of the material combinations selected by the mainboard in each weighing period, that is to say, the number of the material combinations is equal to 3. Each weighing hopper has two doors, each door has an opening facing one discharging route, and the mainboard controls the weighing hopper to open the door desired to be opened when discharging. As shown in FIG. 1, the first outer chute 16 and the second outer chute 10 are symmetrically arranged on both sides of central axis of the combination weighing device, the first inner chute 11 and the second inner chute 17 are symmetrically arranged on both sides of central axis of the combination weighing device; the first outer chute 16 and the first inner chute 11 are located at the same side of the combination weighing device, and the first outer chute 16 is located outside the first inner chute 11; the second outer chute 10 and the second inner chute 17 are located at the same side of the combination weighing device, and the second outer chute 10 is located outside the second inner chute 17; the discharging hoppers comprise a first discharging hopper 12, a second discharging hopper 14, and a third discharging hopper 13, the first outer chute 16 defines a first discharging route with a lower end thereof facing the first discharging hopper 12, the second outer chute 10 defines a second discharging route with a lower end thereof facing the second discharging hopper 14, the first inner chute 11 and the second inner chute 17 define a third discharging route with a lower end thereof facing the third discharging hopper 13.

A block diagram of the circuit of the material treating unit is shown in FIG. 2. Each material treating unit comprises a weighing hopper, a weighing sensor, an A/D converter, a processor, a linear vibrator, a driver for the linear vibrator, a feed hopper, a driver for the feed hopper, and a driver for the weighing hopper. The weighing sensor is connected with the processor via the A/D converter. The processor is connected to the linear vibrator, the feed hopper, and the weighing hopper respectively through the driver for the linear vibrator, the driver for the feed hopper, and the driver for the weighing hopper to control the material adding, weighing and discharging process of the entire material treating unit. Eighteen processors of eighteen material treating units are connected with the mainboard through two data receiving and delivering communication converters of the mainboard in total.

Figure 4:
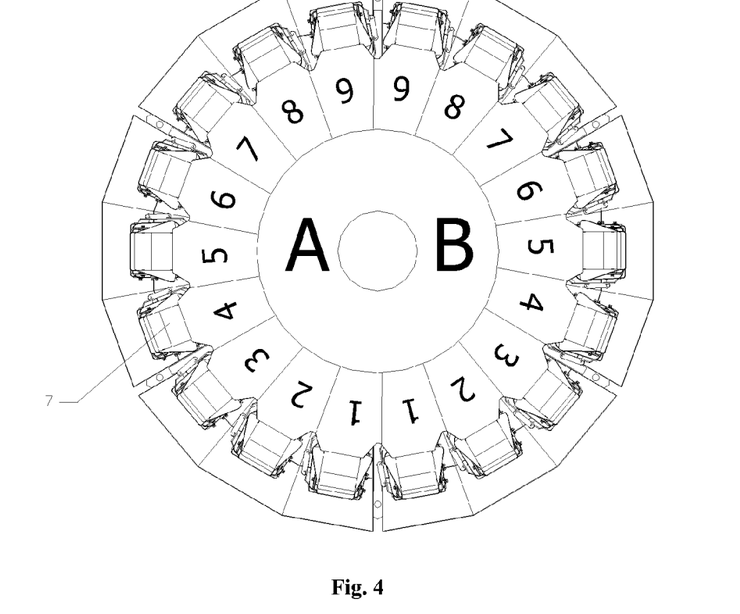
FIG. 4 shows the mechanical arrangement of the 18 weighing hoppers.

As shown in FIGS. 3 and 4, when weighing, the eighteen material treating units are divided into two groups, i.e. A section and B section. Each of these two sections includes nine material treating units indicated with serial number 1 to 9. The materials of the nine material treating units of the A section are obtained from the vibration of the main vibration disk 21 and the main vibration device 31. The materials of the nine material treating units of the B section are obtained from the vibration of the main vibration disk 22 and the main vibration device 32. The nine material treating units of the A section and the nine material treating units of the B section are respectively connected to two data receiving and delivering communication ports of the mainboard. The nine material treating units of the A section are connected by the serial bus and then connected to the communication port of the first CAN (Controller Area Network) bus CAN0 of the mainboard, and the nine material treating units of the B section are connected by the communication port of the second CAN bus CAN1 of the mainboard. The nine material treating units of the A section share one data receiving and delivering communication converter, and the nine material treating units of the B section share another data receiving and delivering communication converter. The mainboard is further connected with the displayer, and determines whether the material treating unit belongs to the A section or the B section through different communication ports of the mainboard. The mainboard is connected to the control unit 41 via the serial bus of the A section and then the control unit 41 is connected to the main vibration device 31, the first discharging hopper and the third discharging hopper. The mainboard is further connected to the control unit 42 via the serial bus of the B section and then the control unit 42 is connected to the main vibration device 32 and the second discharging hopper. The mainboard controls the main vibration devices and discharging hoppers of the A section and the B section through the control unit 41 and the control unit 42 respectively.

The operating method of the combination weighing device of the present invention is as follows:

1. Three groups of material combinations are selected in each weighing period, and the weighing hoppers to be combined are determined, the material combinations according to selecting sequence comprises a first combination, a second combination and a third combination. In particular, the linear vibrator adds materials simultaneously to the weighing hoppers that contain no materials, and the weighing sensor in each material treating unit weighs the materials in the weighing hoppers simultaneously, and the weighing result is sent to the mainboard via the A/D converter, the processor and the data receiving and delivering communication converter on the mainboard. Three combinations that meet the preset target weight are obtained after combinatorial computations with respect to all the weighing hoppers by the mainboard. The first combination is formed by selecting the qualified target weight in the nine weighing hoppers on the left (units with 1 to 9 serial number in the A section), and four weighing hoppers participate in the combination. The second combination is formed by selecting the qualified target weight in the nine weighing hoppers on the right (units with 1 to 9 serial number in the B section), and four weighing hoppers participate in the combination. The third combination is formed by selecting the qualified target weight in the remaining ten weighing hoppers in the left and right sections (unites with serial number 1 to 9 in the A and B sections), and four weighing hoppers participate in the combination.

Figure 5:
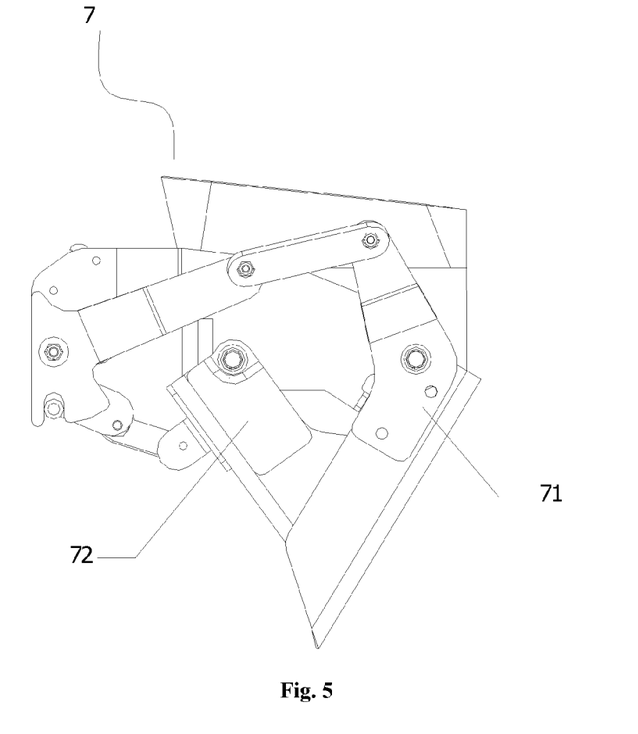
FIG. 5 is a schematic structural view of the weighing hopper.

2. The weighing hoppers to be combined discharge materials to the discharging hopper through the corresponding discharging routes. In particular, after the three combinations are obtained, double inner and outer chutes are used to form three discharging routes and discharge the three combinations of the weighing hopper 7. The first combination materials are discharged through the first discharging route, the second combination materials are discharged through the second discharging route, and the third combination materials are discharged through the third discharging route. As shown in FIG. 5, the weighing hopper 7 has two doors 71 and 72 that are controlled to open and close by the positive and negative rotation of a step motor, and thus materials are discharged through one of the selected discharging routes. The materials of the first discharging route are discharged into the first discharging hopper, the materials of the second discharging route are discharged into the second discharging hopper, and the materials of the third discharging route are discharged into the third discharging hopper.

Figure 6:
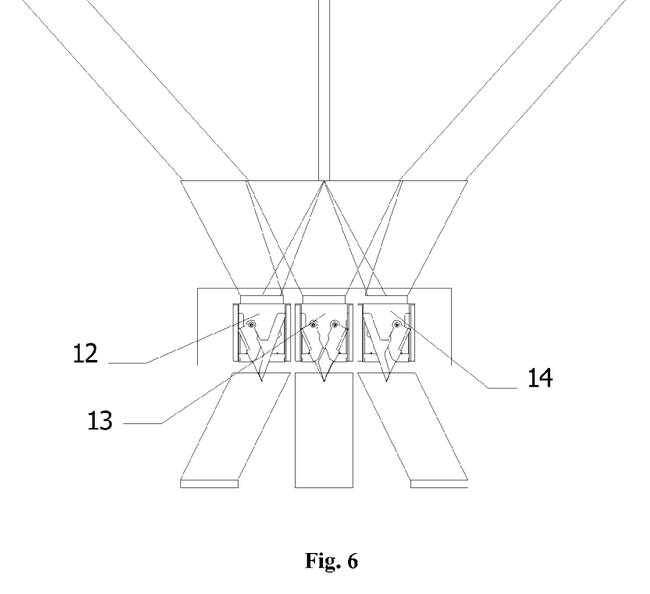
FIG. 6 is a schematic structural view showing the discharging hoppers are connected with three packaging machines.
Figure 7:
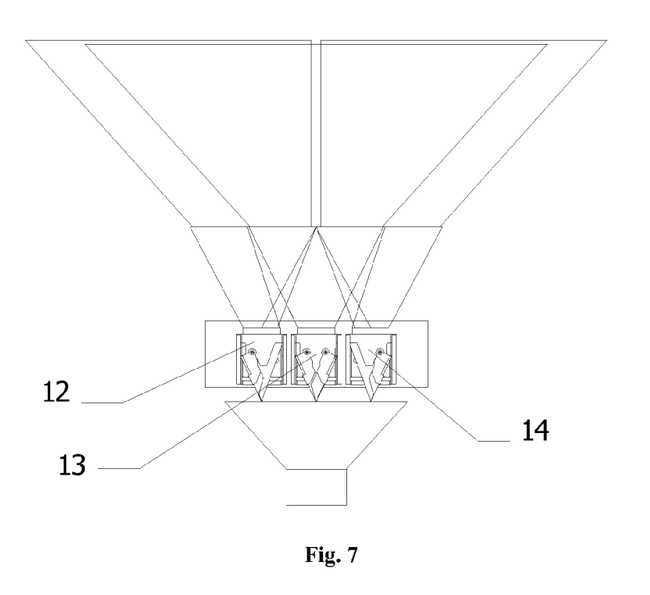
FIG. 7 is a schematic structural view showing the discharging hoppers are connected with one packaging machine.

3. Materials in the discharging hopper is discharged and then packaged. In particular, materials in the three discharging hoppers are put into one or three packaging machines for packing the materials. There are three ways for discharging materials of the discharging hopper: 1. three discharging hoppers receive discharging signals from their packaging machines respectively and discharge materials to their packaging machines respectively, the three discharging hoppers can be connected to three packaging machines respectively, as shown in FIG. 6; 2. three discharging hoppers receive discharging signal from one packaging machine and discharge materials to the packaging machine synchronously, and the packaging machine can be a packaging machine in which three times of the weight can be packaged, or a packaging machine with three-member synchronous packaging machine, as shown in FIG. 7. 3. three discharging hoppers receive discharging signal from one packaging machine, and discharge the materials to the high-speed packaging machine by turns, and the packaging machine is a high-speed packaging machine, as shown in FIG. 7.

4. When materials in the weighing hopper are emptied, the linear vibrator adds materials into the emptied weighing hopper, and the above steps 1 to 3 are repeated.

When the first step is performed, if the qualified combination can not be found in the A section by the mainboard, then additional materials are added into the weighing hopper containing the minimum weight of materials in the A section and each weighing hopper without reaching the preset weight value in the A section, and then proceed the combinatorial computation. The above-mentioned process can be repeated until the qualified combination is found. Similarly, the same way can be used when similar situation occurs during the computation of the second combination and the third combination.

With the present invention, the discharging speed of the combination weighing device is improved by three times with respect to that of the traditional combination weighing device.

It should be emphasized that the above-described embodiments can be combined freely. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A combination weighing device, comprising: N material treating units for receiving materials, outputting a weight value of materials and discharging materials according to the discharging control signal from a mainboard; the mainboard for performing combinatorial calculation periodically according to the weight value inputted from the material treating units, selecting material combinations based on the preset weight value during every period and outputting the discharging control signal to weighing hoppers participating in the material combinations to allow the weighing hoppers to discharge materials through corresponding discharging routes; chutes for defining the discharging routes, collecting the materials from the material treating units through the discharging routes, and discharging the materials to discharging hoppers; discharging hoppers for separately collecting materials discharged from the chutes during the same weighing period and send the materials to a packing machine; each of the material treating units comprising a linear vibrator, a feed hopper, and a weighing hopper, wherein each of the material treating units further comprises a weighing sensor used to weigh the materials in the weighing hopper, a processor and a A/D converter which is connected with the weighing sensor and the processor, a first set of the N material treating units are connected with the mainboard through a first data receiving and delivering communication converter of the mainboard and a second set of the N material treating units are connected with the mainboard through a second data receiving and delivering communication converter of the mainboard.

2. The combination weighing device of claim 1, wherein the number of the discharging routes is equal to the number of the material combinations selected by the mainboard in each weighing period.

3. The combination weighing device of claim 2, wherein said N is 18.

4. The combination weighing device of claim 3, wherein the number of the material combinations selected by the mainboard in each weighing period is 3; the number of the discharging routes is 3, consisting of a first discharging route, a second discharging route and a third discharging route.

5. The combination weighing device of claim 4, wherein the chutes comprise a first outer chute, a second outer chute, a first inner chute, and a second inner chute; the first outer chute and the second outer chute are symmetrically arranged on both sides of central axis of the combination weighing device, the first inner chute and the second inner chute are symmetrically arranged on both sides of central axis of the combination weighing device; the first outer chute and the first inner chute are located at the same side of the combination weighing device, and the first outer chute is located outside the first inner chute; the second outer chute and the second outer inner chute are located at the same side of the combination weighing device, and the second outer chute is located outside the second inner chute; the discharging hoppers comprise a first discharging hopper, a second discharging hopper, and a third discharging hopper, the first outer chute defines a first discharging route with a lower end thereof facing the first discharging hopper, the second outer chute defines a second discharging route with a lower end thereof facing the second discharging hopper, the first inner chute and the second inner chute define a third discharging route with a lower end thereof facing the third discharging hopper.

6. The combination weighing device of claim 5, wherein the weighing hopper in each of the material treating units has two doors, each door has an opening facing one discharging route; the mainboard controls the weighing hopper to open the door desired to be opened when discharging; materials in each material treating unit are discharged through one of the third discharging route and the first discharging route or one of the third discharging route and the second discharging route.

7. An operating method of a combination weighing device comprising three steps: materials in a plurality of weighing hoppers are weighed in each weighing period, and the weighing hoppers to be combined are determined, the material combinations according to selecting sequence comprises a first combination, a second combination and a third combination; the weighing hoppers to be combined discharge materials to the discharging hoppers through corresponding discharging routes; materials in the discharging hoppers are discharged and then packaged; wherein the step of the materials in the weighing hopper being weighted in each weighing period refers to that the weighing sensor in each one of a plurality of material treating units weighs the materials in the weighing hoppers simultaneously, and the weighing results are sent to a mainboard via an A/D converter, a processor and one of a first data receiving and delivering communication converter and a second first data receiving and delivering communication converter on the mainboard, a first set of the plurality of material treating units connected with the mainboard through the first data receiving and delivering communication converter and a second set of the plurality of material treating units connected with the mainboard through the second data receiving and delivering communication converter.

8. The operating method of the combination weighing device of claim 7, wherein the materials being discharged through the corresponding discharging routes refers to the materials being simultaneously discharged from the selected first combination, the selected second combination and the selected third combination to the discharging hoppers, wherein the selected first combination discharges materials through the first discharging route, the selected second combination discharges materials through the second discharging route, and the selected third combination discharges materials through the third discharging route.

9. The operating method of the combination weighing device of claim 8, wherein the materials released from the discharging hoppers are packaged in the following ways: 1. three discharging hoppers are connected to three packaging machines respectively; 2. three discharging hoppers are connected to a packaging machine in which three times of the weight can be packaged, or connected to a packaging machine with three-member synchronous packaging machine; 3. three discharging hoppers are connected to a high-speed packaging machine and discharge the materials to the high-speed packaging machine by turns.

* * * * *